United States Patent Office 2,790,329
Patented Apr. 30, 1957

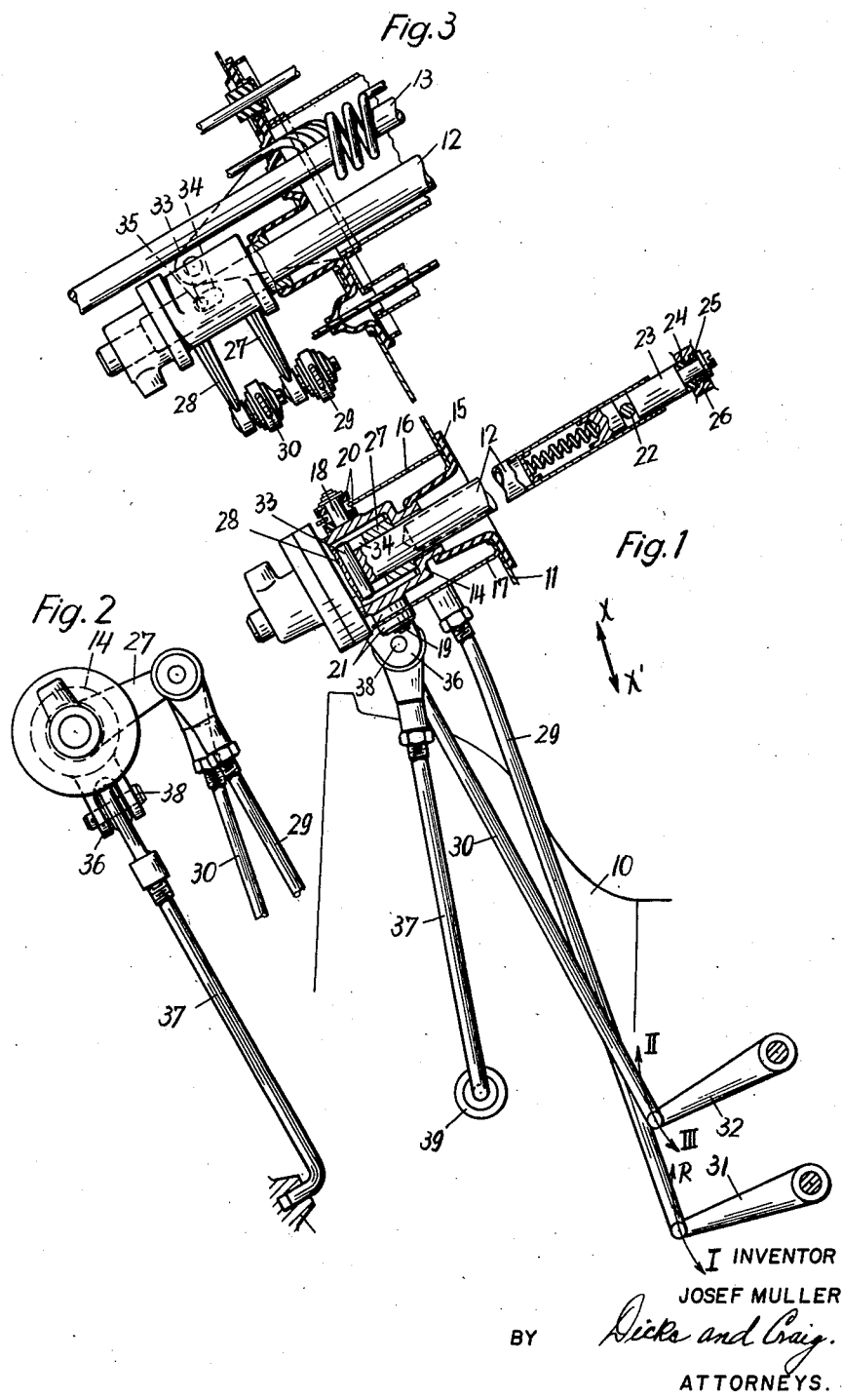

2,790,329

TRANSMISSION GEAR SHIFT DEVICE

Josef Müller, Stuttgart, Germany, assignor to Daimler-Benz Aktiengesellschaft, Stuttgart-Unterturkheim, Germany Application August 27, 1953, Serial No. 376,861

Claims priority, application Germany September 4, 1952

12 Claims. (Cl. 74—473)

This invention relates to a transmission gear shift device with a shifting mechanism adapted for transmitting the shifting motion from one structural part of the vehicle to another structural part thereof flexibly disposed as to the first, in particular such as the body, steering column or another vehicle part flexibly arranged with respect to the transmission. Owing to this flexibility there are produced relative motions between the transmission and the vehicle part supporting the shifting mechanism which affect the gear shift members of the transmission and may cause undesirable shifting difficulties as well as vibrations of the gear shift lever if these relative motions are also transmitted to the shifting mechanism.

It is an object of the present invention to overcome these disadvantages and to so arrange the parts of the shifting mechanism so that the shifting motion cannot be prejudicially affected at any time, notwithstanding relative motions of the vehicle parts with respect to each other.

An important feature of the present invention therefore resides in having the shifting mechanism flexibly mounted on the vehicle part on which it is supported and the shifting mechanism supported on the transmission in such a manner that the shifting mechanism takes positively part at least essentially in the motions of the points of engagement of the shifting rods for transmitting the shifting motion from the shifting device to the transmission.

Another object of the present invention is the provision of means ensuring a kinematically unobjectionable guiding of the shifting linkages. To this end provision is made in particular that the flexibility of the shifting mechanism on the vehicle part on which it is supported is such a one ensuring that the shifting mechanism is flexibly guided with respect to said vehicle part essentially parallel to direction of the shifting rods. In conjunction with this, the housing for the shifting rod may be particularly advantageously mounted on the supporting part by two bifurcatedly arranged blade springs or similar elements.

A further object of the present invention consists in arranging the shifting mechanism in a manner permitting it to swing within certain limits about a lower transverse axis so as to thereby suitably take up the relative motions between the handwheel and the rest of the shifting mechanism.

A still further object of the present invention concerns the mounting of the shifting mechanism in a noise dampening manner to thereby prevent that shocks and noises are transmitted from the transmission to the vehicle body and the steering wheel.

Other objects and features of the present invention will become apparent from the following description taken in connection with the accompanying drawing which illustrates a preferred form of the present invention, and in which—

Fig. 1 is a side view of the transmission gear shift mechanism with parts broken away and shown in section, also showing the upper mounting of the shifting rod in Fig. 1a.

Fig. 2 is a front view of the subject matter shown in Fig. 1, and

Fig. 3 is a vertical view at right angles to Fig. 1 with parts broken away and shown in section.

In Fig. 1 the numeral 10 indicates the transmission case of a motor vehicle and 11 the front wall of the motor vehicle body flexibly disposed with respect to the transmission case. The shifting rod 12 extends through the front wall 11, for example, next to the steering shaft 13. The housing 14 of the shifting rod 12 is supported on the front wall 11 by means of a muff-shaped rubber bumper 15 and mounted thereon by means of two arms 16 and 17 in the form of blade springs. For this purpose, the housing 14 is provided with two pins 18 and 19 which extend through bores in the ends of the blade springs 16 and 17 and are secured thereon by lock or spring washers or the like with rubber buffers 20, 21 interposed. The upper end of the shifting rod 12, which is suitably adjustable by a shifting lever 22 in longitudinal and rotary direction, is mounted upon a bearing pin 23 which on its part is elastically mounted with interposed rubber buffers 24, 25 on a relatively stationary part 26 as, for example, the steering-column jacket rigidly or flexibly connected to the front wall 11.

Within the housing 14, which is open on one side, there are mounted on the shifting rod 12 two levers 27 and 28 which are connected by means of the shifting rods 29 and 30, serving for transmitting the shifting motion to the transmission, with the gear shift levers 31 and 32 on the transmission case, with the lever 31 shifting the first speed and the reverse, and the lever 32 the second and third speeds for example. A coupling pin 33 within the hollow shifting rod 12 can alternately be brought into engagement with slots 34 and 35 of the levers 27 and 28 respectively by displacement of the shifting rod 12 and thereby couple these with the gear shift levers 31 and 32 respectively of the transmission. By turning the shifting rod 12 in the one or the other direction, the respective speed can then be put in.

The housing 14 of the shifting mechanism is further provided with a forked eye 36 on which is linked by means of a bolt 38, the one end of a supporting rod 37, the other end of which is hooked in the bore 39 of the transmission case 10.

On relative motions between the transmission case 10 and the front wall 11 in the direction x—x', the housing 14 is moved in unison with case 10 by means of the supporting rod 37 so that a prejudicial or adverse effect on the shifting operation of the gear shift levers 31 and 32 caused by relative motions of the shifting mechanism 14 and of case 10 is prevented, or at least essentially prevented. In conjunction with this, the blade springs 16 and 17 cause that the housing 14 together with the lower end of the shifting rod 12 can yield in the direction towards the shifting rods 29, 30; at the same time it is swung about the upper supporting point of the shifting rod 12 in the rubber buffers 24 and 25 and guided essentially parallel to the front wall 11 by the blade springs 16 and 17.

It will be obvious that various modifications may be made in the embodiment above described without in any way departing from the spirit of the invention as defined in the appended claims.

What I claim is:

1. A gear shift mechanism for vehicle transmissions with a first gear shift member for effecting the shifting motion mounted on a first vehicle part and a second gear shift member for effecting the shifting motion mounted on a second vehicle part, said second vehicle part being flexibly arranged as to said first vehicle part, comprising an intermediate member for transmitting the shifting motion from said first to said second gear shift member, said intermediate member being displaced in a predetermined direction for transmitting the shifting motion, mounting means flexibly supported on one of said two vehicle parts for mounting the gear shift member associated with said one vehicle part, and a connecting member connecting said mounting means with the other vehicle part for rigidly supporting said mounting means and said other vehicle part with respect to each other at least approximately in said predetermined direction.

2. A transmission gear shift mechanism for vehicles having a transmission case flexibly mounted with respect to a body part of the vehicle comprising a first gear shift member for effecting the shifting motion, a mounting for said gear shift member, means for elastically attaching said mounting on said body part, a second gear shift member for effecting the shifting motion mounted on said transmission case, an intermediate member for transmitting the shifting motion from said first to said second gear shift member connected with both of said members, a connecting member, and means for connecting said connecting member, on the one hand with said mounting and on the other hand with said transmission case to provide common movement of said mounting with the relative motions of said transmission case during relative motions of said transmisson case with respect to said body part in direction of said connecting member.

3. A gear shift mechanism for vehicle transmissions with a first gear shift member for effecting the shifting motion mounted on a first vehicle part and a second gear shift member for effecting the shifting motion mounted on a second vehicle part, said second vehicle part being flexibly arranged as to said first vehicle part, comprising a lever on said first gear shift member, a lever on said second gear shift member, an intermediate rod articulatedly connecting said levers with one another, a mounting for said first gear shift member, means for elastically connecting said mounting with the vehicle part associated with said first gear shift member, and a connecting linkage connecting said mounting with said second vehicle part that to essentially positively couple said mounting with said second vehicle part in the direction of the motion of said intermediate rod occurring during the transmission thereby of the shifting motion.

4. The gear shift mechanism of claim 1 with means for flexibly connecting said mounting means with said first vehicle part comprising guide members for said mounting means to restrict movement thereof essentially only in said predetermined direction.

5. The gear shift mechanism of claim 1 with means for flexibly connecting said mounting means with said first vehicle part comprising blade spring elements arranged at a distance from each other essentially in planes perpendicularly to said predetermined direction and connected with one end thereof to said first vehicle part and with the other end thereof to said mounting means to limit motion thereof essentially only to a parallel motion in said predetermined direction.

6. The gear shift mechanism of claim 1 with means for guiding said mounting essentially parallel in said certain direction relative to said first vehicle part, and means for a limitedly flexible pivotally connection of said mounting with said first vehicle part about an axis located in said certain direction.

7. A gear shift mechanism for vehicle transmissions comprising a mounting, a first lever on said mounting, a second lever on said mounting, said first and said second lever being so mounted in said mounting as to be turnable about the same axis in said mounting and with essentially equally directed lever arms, means for alternately swinging said levers through the medium of a gearshift operating mechanism, means for flexibly attaching said mounting to a first vehicle part, third and fourth levers mounted on a second vehicle part for transmitting the shifting motion to a transmission arranged on said second vehicle part and with essentially equally directed lever arms, a first intermediate rod for articulatedly connecting said first lever with said third lever, a second intermediate rod for articulatedly connecting said second lever with said fourth lever, said intermediate rods extending essentially in the same direction and being upon the swinging motion of said first and second levers displaced essentially in their longitudinal direction so as to thereby swing said third and fourth levers, and a supporting member between said mounting and said second vehicle part so arranged as to effect that on relative motions between said two vehicle parts in direction of said rods said mounting is carried along by said second vehicle part essentially in direction of said intermediate rods.

8. The gear shift mechanism of claim 7, wherein said means for flexibly attaching said mounting on said first vehicle part comprise means for guiding said mounting parallelly in the direction of said intermediate rods.

9. The gear shift mechanism of claim 7, wherein said means for flexibly attaching said mounting on said first vehicle part comprise two blade springs attached on the one hand to said vehicle part and on the other hand to said mounting and located above each other in the direction of said rods and extending essentially vertically thereto so that said mounting can perform essentially only a parallel motion in the direction of said rods.

10. The gear shift mechanism of claim 7, wherein said supporting member comprises a rod, with means for articulatedly connecting said rod to said mounting on the one hand and to said second vehicle part on the other hand, and wherein said means for flexibly attaching said mounting to said first vehicle part comprise means for guiding said mounting parallelly as to said first vehicle part.

11. The gear shift mechanism of claim 7, wherein said means for flexibly attaching said mounting on said first vehicle part comprise means for parallelly guiding said mounting essentially in direction of said intermediate rods, with means for turnably mounting said mounting about a fulcrum point essentially extending in the direction of said intermediate rods, and flexible means for flexibly supporting said mounting against unrestrained swinging movement about said fulcrum point with respect to said first vehicle part.

12. A gear shift mechanism for transmissions in a vehicle having two parts movable relative to each other comprising first means mounted on one of said two parts for transmitting the shifting movement, second means mounted on the other of said two parts for transmitting the shifting movement, third means movable substantially in only a predetermined direction for connecting said first means with said means to transmit the shifting movement therebetween, flexible mounting means for flexibly mounting said first means at said one vehicle part, and fourth means connecting said flexible mounting means with said other vehicle part to prevent relative movement of said flexible mounting means and said other vehicle part in said predetermined direction.

References Cited in the file of this patent

UNITED STATES PATENTS

| 2,286,773 | Wahlberg | June 16, 1942 |
| 2,290,927 | Wharam | July 28, 1942 |
| 2,631,467 | Lincoln | Mar. 17, 1953 |

FOREIGN PATENTS

| 467,271 | Canada | Aug. 8, 1950 |